(12) United States Patent
Hayman

(10) Patent No.: US 7,382,136 B2
(45) Date of Patent: Jun. 3, 2008

(54) SHIELDED APPARATUS FOR REDUCING AN ELECTRICAL FIELD GENERATED BY A PAD DURING ELECTRICALLY EXPLORING GEOLOGICAL FORMATIONS

(75) Inventor: Andrew J. Hayman, Voisins-le-Bretonneux (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 116 days.

(21) Appl. No.: 10/554,300

(22) PCT Filed: Apr. 2, 2004

(86) PCT No.: PCT/EP2004/003660

§ 371 (c)(1),
(2), (4) Date: Oct. 25, 2005

(87) PCT Pub. No.: WO2004/097173

PCT Pub. Date: Nov. 11, 2004

(65) Prior Publication Data

US 2006/0267591 A1 Nov. 30, 2006

(30) Foreign Application Priority Data

May 2, 2003 (GB) .................................. 0310114.4

(51) Int. Cl.
*G01V 3/18* (2006.01)

(52) U.S. Cl. ...................................... 324/367; 324/374

(58) Field of Classification Search ................ 324/347, 324/355, 366, 367, 373, 374, 375; 702/7, 702/11
See application file for complete search history.

(56) References Cited

U.S. PATENT DOCUMENTS

| 3,566,682 | A | | 3/1971 | Winkler, Jr. |
| 4,002,063 | A | | 1/1977 | Angehrn |
| 4,468,623 | A | * | 8/1984 | Gianzero et al. ........... 324/367 |
| 4,567,759 | A | * | 2/1986 | Ekstrom et al. ......... 73/152.02 |
| 4,738,812 | A | | 4/1988 | Raynal |
| 6,191,588 | B1 | * | 2/2001 | Chen .......................... 324/367 |
| 6,891,377 | B2 | * | 5/2005 | Cheung et al. ............. 324/374 |
| 6,919,724 | B2 | * | 7/2005 | Cheung et al. ............. 324/366 |

FOREIGN PATENT DOCUMENTS

WO      WO01/77711      10/2001

* cited by examiner

*Primary Examiner*—Jay M Patidar
(74) *Attorney, Agent, or Firm*—Bryan L. White; Darla Fonseca; Jamie Costaño

(57) ABSTRACT

An apparatus for investigating the wall of a borehole in a geological formation. The pad having shielding means which are arranged between a source electrode and a set of measurement electrodes and between the measurement electrodes and a return electrode. The shielding means being flush with or almost flush with the outside face of the pad and extending along the length of the outside face of the pad so that the electric field generated by the current and return electrodes is substantially eliminated in the pad and in the vicinity of the measurement electrodes.

14 Claims, 5 Drawing Sheets

—Prior Art—

—Prior Art—

—Prior Art—

SHIELDED APPARATUS FOR REDUCING AN ELECTRICAL FIELD GENERATED BY A PAD DURING ELECTRICALLY EXPLORING GEOLOGICAL FORMATIONS

The present invention relates in general terms to electrically exploring a borehole passing through formations in the ground, and more precisely it relates to an improved shielded apparatus that enables data that has been acquired by high resolution investigation of the wall of a borehole to be put into the form of images.

In general terms, in order to explore hydrocarbon deposits, it is highly desirable to obtain accurate knowledge of the characteristics of the geological formation at various depths of the borehole. Many of these characteristics are very fine in structure, e.g. stratifications, non-uniform elements, pore characteristics, fractures, etc. By way of example, the orientations, the density, and the lengths of fractures play a major role in the dynamic characteristics of a reservoir rock. Two types of measurement techniques have been implemented, depending on the type of mud that has been used to drill the well. Some of those techniques, among which U.S. Pat. No. 4,567,759, address measurements in conductive mud.

Other techniques address measurements in non-conductive mud, among which U.S. Pat. No. 6,191,588. That tool for investigating formation conductivity uses a non-conductive pad and buttons that form voltage electrodes instead of current electrodes as described in document U.S. Pat. No. 4,468,623. The current injection electrodes are situated off the pad, or in a preferred variant, directly at the ends thereof. In any event, the two injectors are placed in such a manner that current passes through the formation substantially parallel to the pad and thus preferably flows substantially orthogonally to the boundaries of the strata. Under such conditions, the potential difference between two buttons is proportional to the resistivity of the material facing the buttons.

The above-specified U.S. Pat. No. 6,191,588 recommends using DC, or AC at very low frequency, such that the resistivity of the pad is much greater than the resistivity of the drilling mud. However, in practice, working with DC gives rise to problems of noise due in particular to the formation of spontaneous potentials in the formation. In addition, the resistance of the mud limits the quantity of current injected; the potential differences measured between two pairs of buttons are thus very small and therefore difficult to measure.

It would therefore be desirable for it to be possible to work with AC at a relatively high frequency, e.g. of the order of a few thousand hertz. Unfortunately, at such frequencies, the pad behaves like a dielectric whose effective conductivity is similar to that of the mud. This gives rise to an electrical impedance through the pad that is of the same order as the impedance through the layer of mud. Under such conditions, the potential differences between pairs of buttons are more representative of the potential difference applied between the current electrodes than they are of the resistivity of the formation facing them, and as a result the tool becomes unusable.

Patent application WO 01/77710 describes an improvement of this former patent to make it possible to work with AC at frequencies higher than 1000 Hz. Therefore, this patent application provides a tool for investigating the wall of a borehole in a geological formation that comprises a non-conductive pad near the end of which are mounted an AC source electrode and a current return electrode and in the center of which is an array of pairs of voltage difference measurement electrodes (dV). The resistivity of the formation opposite each pair of dV electrodes is calculated using:

$$\rho = k \cdot dV/I$$

where $\rho$ is the resistivity, k is a geometrical factor, dV is the voltage difference between a pair of electrodes and I is the current in the formation.

To shield the dV electrodes from the electric field generated in the insulating pad and in the non-conducting fluid, a conducting backplate is present behind the insulating pad, parallel to the front face and covering most of the region between the current electrodes. This shielding plate is held at a potential close to that of the formation in front of the dV electrodes.

The major limitation of the measurement is that the pad must be close to the borehole wall, especially in low-resistivity formations, or else the dV measurement is sensitive to the electric field generated in the borehole fluid and pad rather than in the formation. For example, in a 0.1 Ω.m formation the maximum standoff is about 5 mm while in a 100-Ω.m formation the maximum standoff is about 15 mm. As a result, when the borehole is rough the images are spoilt by incorrect readings and uninterpretable.

It is thus an object of the invention to propose an improved shielded apparatus for logging formations through which a non-conductive mud well passes. To this end, the invention proposes an apparatus for investigating the wall of a borehole in a geological formation, the apparatus comprising:

- a pad having an inside face and an outside face for pressing against the wall of the borehole;
- a set of measurement electrodes mounted on the outside face of the pad and means for measuring the potential difference between two measurement electrodes;
- both a source electrode adapted to inject current into the formation and a return electrode, the set of measurement electrodes being situated between the source electrode and the return electrode;

characterized in that said pad further comprises shielding means which are arranged between the source electrode and the measurement electrodes and between the measurement electrodes and the return electrode, said shielding means being flush with or almost flush with the outside face of the pad.

Due to these particular features, the apparatus according to the invention allows performing accurate resistivity measurements in non-conductive mud wells, even when the pad is not closely pressed against the formation wall, due to thick mudcake or rugosity of said wall. Due to the shielding means, this electrical field is eliminated or almost eliminated in the pad itself. In the mud between the pad and the borehole wall, the electrical field is also drastically reduced in the vicinity of the measurement electrodes such that electric equipotential curves in the mud remain almost perpendicular to the formation wall. Therefore, the potential at these measurement electrodes remains close to that in the formation.

In an embodiment of the invention, the pad itself constitutes the shielding means, said pad being made of electrically conductive material. In this case, electrically insulating inserts are arranged in the pad around each of the source, return and measurement electrodes.

This embodiment is of particular interest for enhancing the mechanical strength of the apparatus according to the invention. Furthermore, the pad is more wear-resistant and the conductive pad shields the measurement electrodes from the current electrode, which allows measurement to be made at greater distances between the pad and the borehole wall.

According to the invention, insulating means electrically insulates the outside face of the conductive pad from the formation. The insulating means comprises an insulating layer of non-conductive material, said layer covering the outside face of the pad. In another embodiment of the invention, the insulating means comprise spacer means that maintains a standoff between the outside face of the pad and the borehole wall.

In a second embodiment of the invention, the pad is made of electrically non conductive material and the shielding means comprise electrically conductive sheets that are arranged inside said pad such that said conductive sheets are almost flush with the outside face of said pad.

In a first example, the electrically conductive sheets are molded inside the pad and comprise first sheets that face each of the current, return and measurement electrodes and are molded on the inside face of the pad and second sheets that are molded almost flush with the outside face of the pad, said first and second sheets being connected to each others.

This embodiment reduces significantly the overall weight of the apparatus according to the invention while being as efficient as the previously mentioned embodiment concerning the shielding of the measurement electrodes.

In a second example, the shielding means comprise a first sheet that covers the inside face of the pad and second sheets that are almost flush with the outside face of the pad. The recesses between the second sheets and the outside face of the pad are filled with a non-conductive material. This embodiment has the advantage of being relatively light and easy to manufacture.

The invention also proposes a method for investigating the wall of a borehole in a geological formation wherein a borehole filled with non-conductive mud passes, the method comprising:

pressing a pad against the borehole wall, said pad comprising a current electrode and a return electrode;

injecting a current into the formation via said current electrode and said return electrode between which a potential is applied;

measuring the potential difference between at least two measurement electrodes situated on the pad between the source electrode and the return electrode, said potential difference being representative of the formation resistivity;

characterized in that said method further comprises shielding the measurement electrodes such that the electric field generated by the current and return electrodes is eliminated or almost eliminated in the pad and in the vicinity of the measurement electrodes.

Additional objects and advantages of the invention will become apparent to those skilled in the art upon reference to the detailed description taken in conjunction with the provided figures.

Figure 1A:
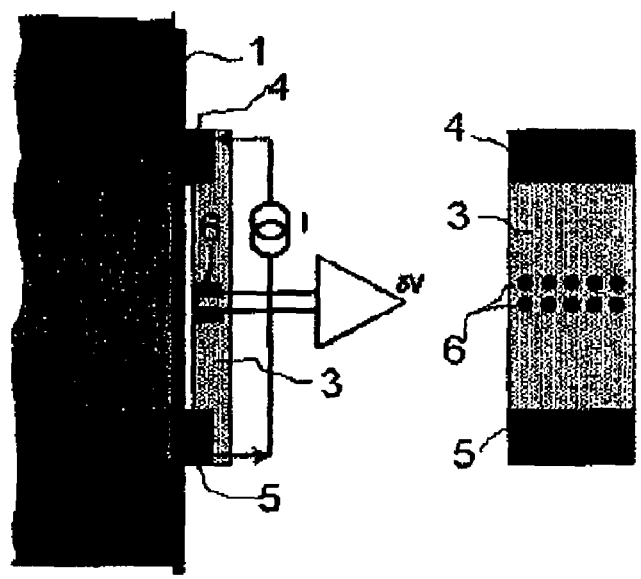
FIGS. 1a and 1b represent a pad of an existing apparatus for investigating the wall of a borehole.

FIG. 1a is a diagram showing the principle on which electrical measurement is based in the imaging technique described in international patent application PCT/US99/14420. That apparatus is particularly adapted to investigate the wall 2 of a borehole drilled with a non-conductive drilling mud, for example a drilling fluid whose liquid phase is constituted essentially by an oil (diesel oil, synthetic oil) or by a water-in-oil emulsion. The term "oil-base mud" is used below to designate drilling fluids of either of those types. The drilling mud forms a mud layer 1 along the wall 2.

The apparatus of the prior art has a pad 3 made of an electrically insulative material such as a ceramic or polymer having high strength and high thermal and chemical stability. The pad serves as a support for two current injectors: the source electrode 4 and the return electrode 5. These two electrodes are situated at opposite ends of the pad and occupy the entire width thereof, or at least they occupy a large fraction of its width, so as to maximize the surface areas of these current injection electrodes. The central portion of the pad has two rows of measurement electrodes 6 that are pressed against the borehole wall by an arm 7.

Figure 1B:
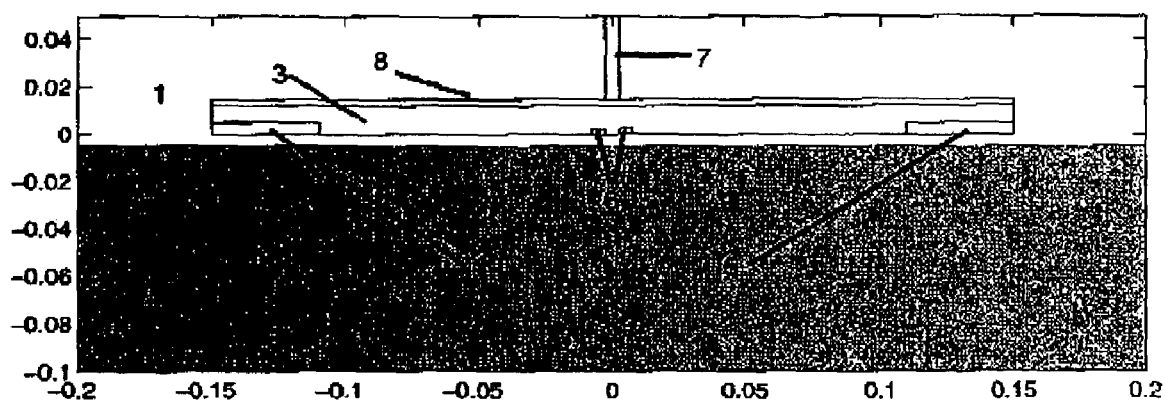

As represented on FIG. 1b, the measurement electrodes 6 are shielded from the electric field generated in the insulating pad and in the non-conducting fluid by a conducting backplate 8 that is present on the inside face of the pad and covering most of the region between the source and return electrodes 4 and 5. This shielding backplate 8 is held at a potential close to that of the formation. The major limitation of this pad of the prior art is that it must be close to the borehole wall, especially in low-resistivity formations, or else the measurement electrodes are sensitive to the electric field generated in the borehole fluid and pad rather than in the formation. For example, in a 0.1 $\Omega$.m formation the maximum standoff is about 5 mm while in a 100-$\Omega$.m formation the maximum standoff is about 15.

Figure 2:
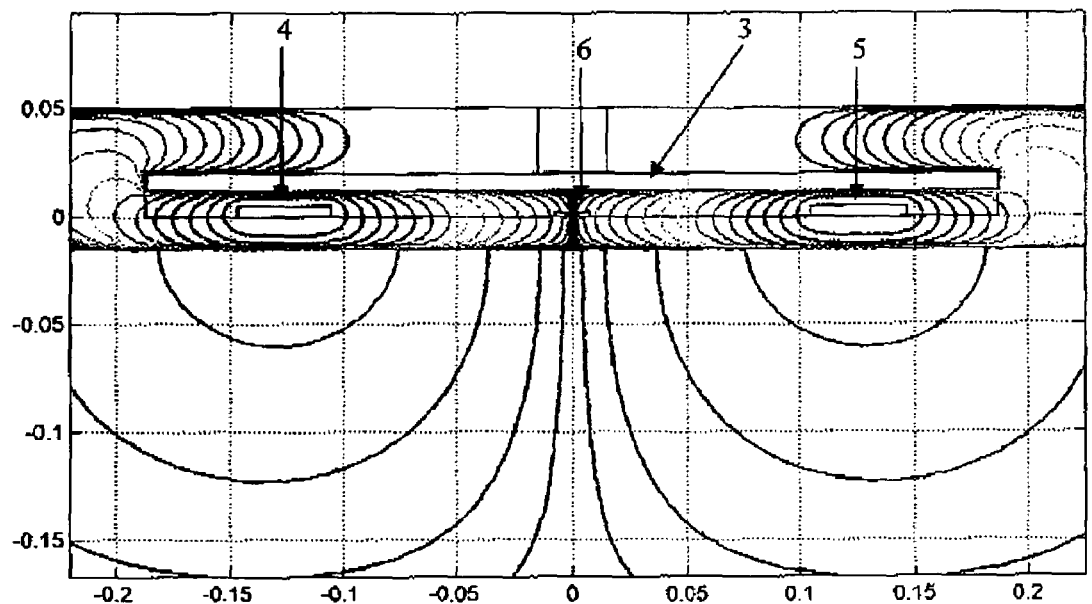
FIG. 2 represents the calculated electric equipotential curves around said prior art pad.

FIG. 2 shows the calculated electric equipotential curves for a formation resistivity of 0.1 $\Omega$.m and a pad standoff of 15 mm. The contour lines are spaced at equal intervals of log (abs (V)) where V is the potential, so that the contour separation is approximately half of one decade of potential. The potential of each curve is higher and the distance between two of these curves is lower in the vicinity of the measurement electrodes than it is in the formation directly opposite the measurement electrodes 6. Therefore, the measurement electrodes read the potential difference in the mud and pad, rather than the smaller potential difference in the formation.

To improve the shielding of the measurement electrodes from the current electrodes, the invention aims at placing the shielding means closer to the outside face of the pad in the regions between the injectors and the measurement electrodes. Therefore, the shielding means will be placed flush or almost flush with the outside face of the pad. When doing this, the electrical field created in the pad is eliminated (see embodiment with conductive pad) or almost eliminated (see embodiment with non-conductive pad). Furthermore, this electrical field is almost eliminated between the outside face of the pad and the formation wall in the vicinity of the measurement electrodes. Therefore, the electrical equipotential curves in the mud are almost perpendicular to the borehole wall (and to the outside face of the pad) in the vicinity of the measurement electrodes, which ensures that the potential at said electrodes remains close to that in the formation.

Figure 3A:
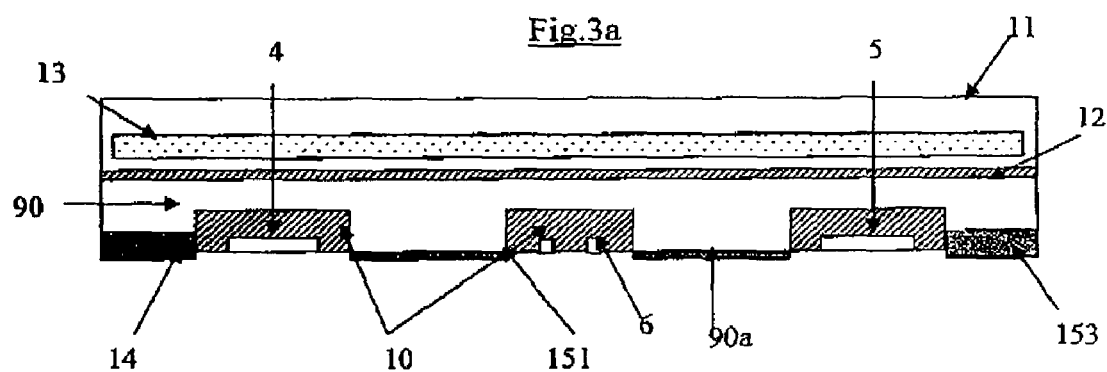
FIGS. 3a to 3c represent first examples of a pad in one embodiment of an apparatus according to the invention.
Figure 3B:
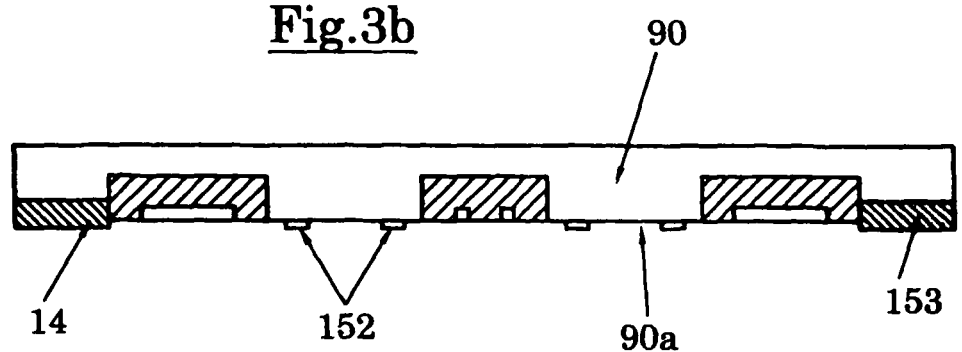
Figure 3C:
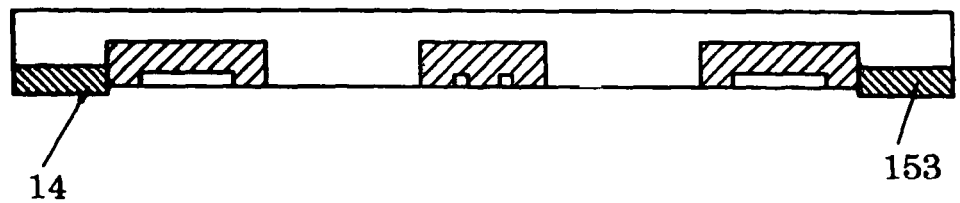

FIGS. 3a to 3c represent a first embodiment of an apparatus according to the invention. This arrangement consists of a conductive metallic pad structure 90 that contains insulating inserts 10 around the source and return electrodes 4 and 5 and measurement electrodes 6. Therefore, in this embodiment of an apparatus according to the invention, it is the conductive pad 90 itself that shields the measurement electrodes. Of course, the shielding means are thus flush with the outside face of the pad. The conducting pad 90 reduces significantly the electrical field that the source electrode sets up in the insulating inserts and mud by an order of magnitude or more compared to the existing technique, and it enables good measurements to be made at more than twice the standoff in low resistivity formations. No electrical field is generated in the conductive pad itself.

The conductive pad 90 is held at a potential close to that of the formation in front of the measurement electrodes. For example, in one preferred implementation the pad is driven at the measured potential of the formation in front of the measurement electrodes 6. As mentioned in patent application WO 177711, an electronic circuit, not shown, averages all the potential values measured by all the measurement electrodes. Furthermore, in this embodiment, the conductive pad 90 must be insulated from the rest of the apparatus. One method of insulation is shown in FIG. 3a, where the pad is insulated from a pad base 11 by an insulating sheet 12 and fixed to the base by insulated screws, not shown. As represented on FIG. 3a, a gap 13 is maintained between the insulating sheet 12 and the pad base 11. This gap enables to locate various electronics in order to process signals coming from the measurement electrodes.

The conductive pad 90 must not short-circuit the current path in the formation if it touches the formation 2. It is however desirable to allow the pad to contact the formation at one point to minimize the potential difference between the pad and formation due to leakage currents. The contact point is conveniently a conducting wear plate 14 at one end of the pad, or the end of an arm 7 (said arm being linked to the tool body, not shown) that presses the pad against the formation. Another insulating wear plate 153 is mounted at the other end of the pad. Apart from the desired contact point, the rest of the conductive pad 90 must also be insulated from the formation. Various examples of insulation means are shown in FIG. 3a to 3c. According to the example showed in FIG. 3a, an insulating layer 151 of plastic or ceramic covers the outside face 90a of the pad 90 between the source electrode and the return electrode and the measurement electrodes respectively. In another example represented on FIG. 3b, insulating spacers 152 maintain a standoff of non conductive mud between the outside face of the pad and the formation. In still another example represented on FIG. 3c, insulating or insulated wear plates 153 at one or both ends of the pad maintain a thin layer of non-conductive mud between the pad and formation. For examples of FIGS. 3a and 3b, wear plates—made of high-resistance material—should preferably be mounted at the ends of the outside face of the pad to minimize wear on the pad, and at least one of the wear plates should be electrically insulated.

In a practical implementation, the pad length is of the order of tens of centimeters, the thickness of the insulating inserts 10 around the source, return and measurement electrodes is of centimeter order and the thickness of the insulating layers 151 to 153 is of millimeter order. The insulating inserts 10 can be made of plastic such as PEEK, or a ceramic. The insulating layers 151 and 152 are preferably made of wear-resistant ceramic. Since they are likely to rub against the formation wall, the insulating wear plates 153 are preferably made of ceramic or of metal insulated by a layer of plastic or ceramic. The use of a metallic pad is advantageous mechanically compared to a plastic or ceramic pad since the pad is stronger and more wear-resistant.

Figure 4:
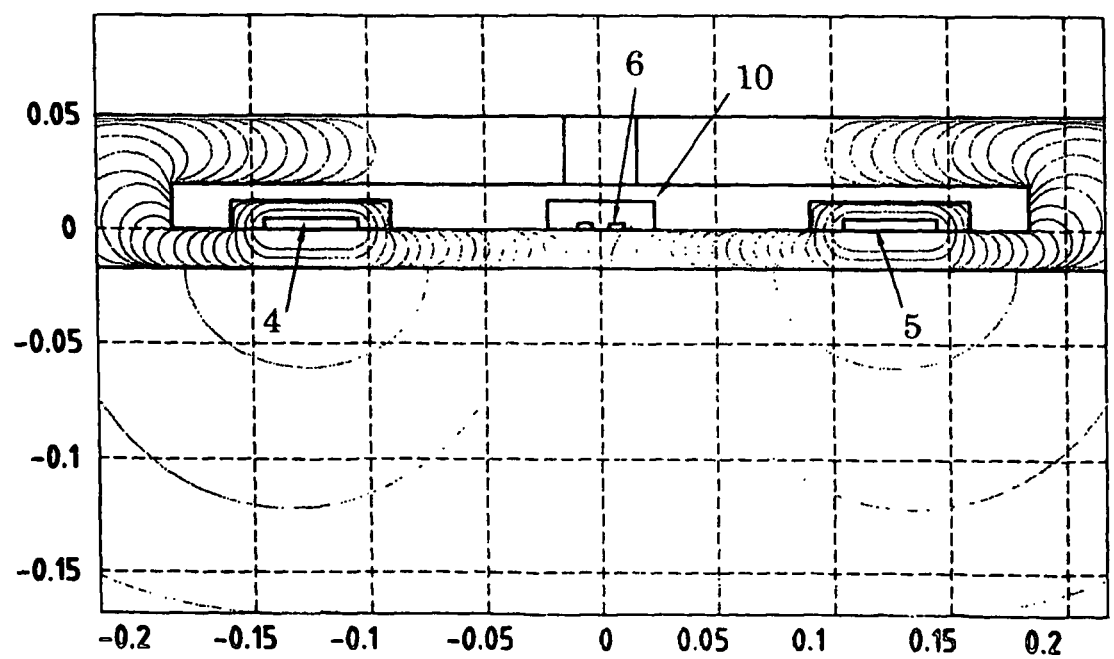
FIG. 4 represents the electric equipotential curves around said first embodiment of an apparatus according to the invention.

The calculated equipotential curves around such a conductive pad 90 are plotted in FIG. 4, for the same mud layer as the pad of the prior art which equipotential curves are shown on FIG. 2. The potential in the mud layer decreases more rapidly than in FIG. 2, allowing the measurement electrodes to sense the potential difference in the formation. Almost no electrical field is created by the current electrode either in the pad or in the mud between the outside face of the pad and the borehole wall in the region of the measurement electrodes. Therefore, the contours of the equipotential curves remain perpendicular to the borehole wall in the vicinity of the measurement electrodes and the potentials at said measurement electrodes are thus close to those in the formation.

Figure 5:
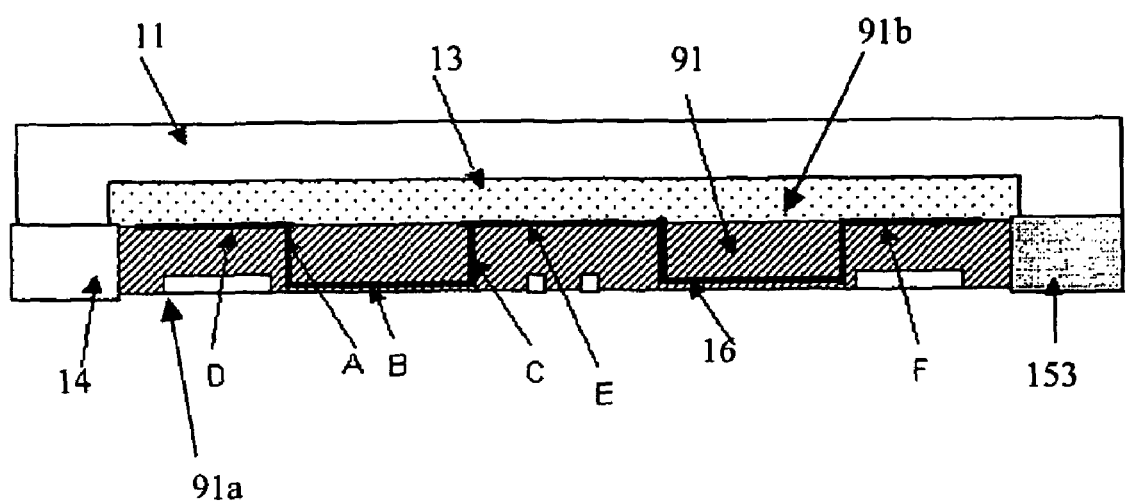
FIG. 5 represent a second embodiment of an apparatus according to the invention.

FIG. 5 represents a second embodiment of an apparatus according to the invention. In this embodiment, the pad 91 is made of insulating material and the shielding means are constituted of conducting (eg:metallic) sheets 16. The shielding means are held a potential close to that of the formation as explained above. This embodiment is thus electrically equivalent to the one presented on FIGS. 3a to 3c. In, this case, the shielding means are almost flush with the outside face of the pad. Actually, the remaining distance between the shielding means and the outside face of the pad is as small as possible, considering mechanical constraints.

In order not to weaken the outside face 91a of the pad 91, parts A, B and C of the shielding sheets 16 can be molded inside the pad, with part B almost flush with its outside face. Parts D, E and F are situated on the inside face 91b of the pad and can be fixed mechanically to A, B and C, or they can form part of the pad base 11, in which case they are only connected electrically to A, B and C. A gap 13 can still be provided to include various electronics. Conductive and insulating wear plates 14 and 153 are attached to the ends of the pad. Since the part B is molded inside the insulating pad 91, a thin layer of non-conductive material constituted by the outside face of the pad exists between said conductive sheet and the formation. This layer is kept as thin as possible.

Figure 6:
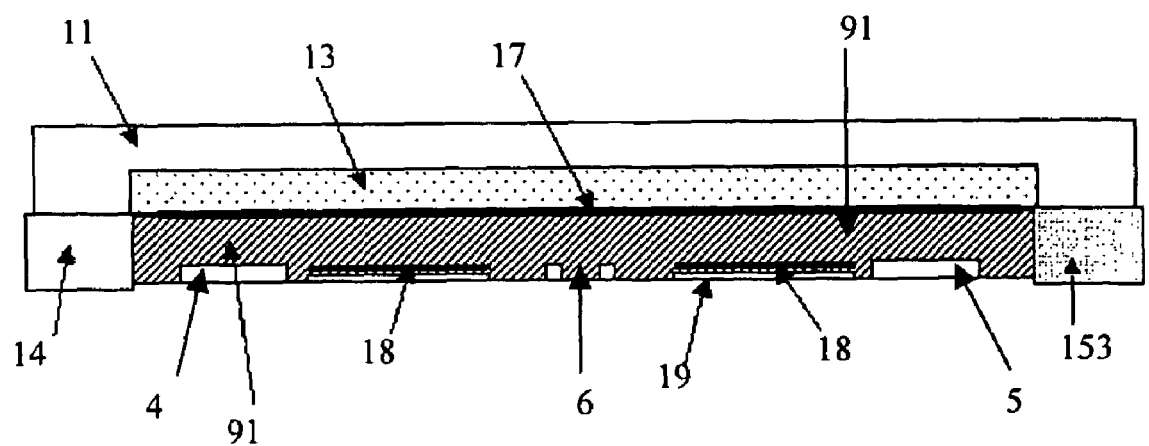
FIG. 6 represents a third embodiment of an apparatus according to the invention.

Another embodiment of an apparatus according to the invention is presented on FIG. 6. In this embodiment, shielding means are constituted by a continuous conductive sheet 17 that is placed on the inside face 91b of the pad 91, while conductive sheets 18 are fixed to the outside face of the pad 91a between each source or return electrode and the measurement electrodes respectively. The shielding sheets 18 should be recessed slightly from the outside face of the pad, to avoid contacting the formation, and the resulting gaps can be filled with insulating sheets 19 that are glued in place, or they can be left empty to fill with non-conductive mud. The combination of sheets 17 and 18 provides shielding from fields in the mud equivalent to previously explained embodiments. The recesses are kept as small as possible to maintain the shortest distance between the shielding means and the outside face of the pad. The thickness of the pad in the region between the sheets 17 and 18 should be as thin as possible consistent with mechanical constraints. Those shielding means are held at a potential close to that of the formation. Wear plates 14 and 153 as previously described are attached to the ends of the pad.

Figure 7:
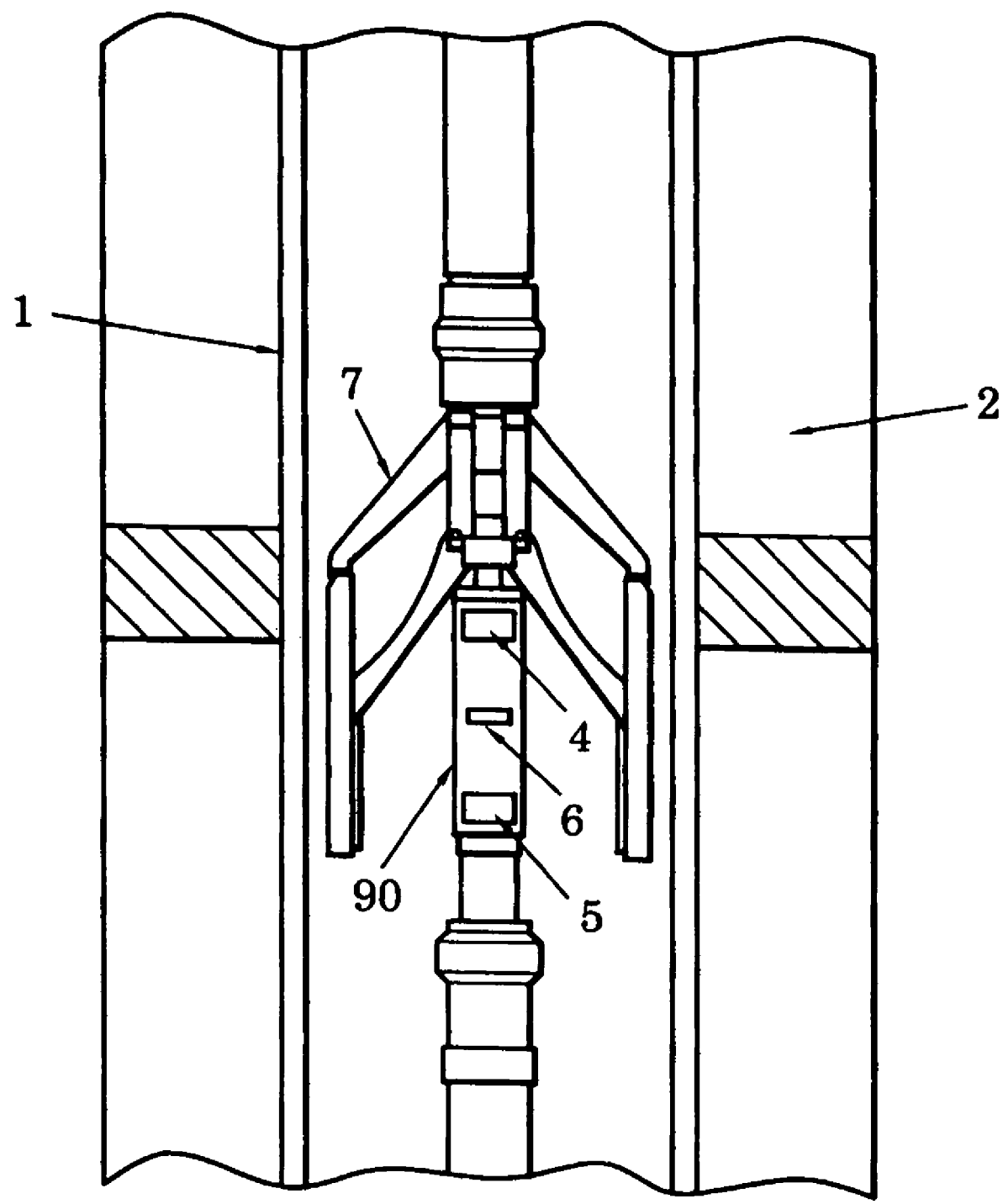
FIG. 7 represents a borehole wherein the apparatus according to the invention is in use.

FIG. 7 represents an example of a borehole wherein the formation resistivity is measured using an apparatus according to the invention. According to the method of the invention, the pad 90 (or 91) is pressed against the mud layer 1 covering the borehole wall. Then the current 4 and return 5 electrodes inject a current into the formation 2. The potential difference is measured between at least two measurement electrodes 6, said potential difference being representative of the formation resistivity. According to the invention, these measurement electrodes are shielded such that the electric field generated by the current and return electrodes is eliminated or almost eliminated in the pad and in the vicinity of the measurement electrodes.

The apparatus of the invention significantly enhances the efficiency of the shield around the measurement electrodes compared to the shield of the prior art. Therefore, the resistivity measurement performed with the apparatus of the invention are much less dependent on the standoff between the pad of the apparatus and the borehole wall, which is of particular interest in an environment that is generally rugged or where the thickness of the mudcake might be important.

The invention claimed is:

1. An apparatus for investigating the wall of a borehole in a geological formation, the apparatus comprising:
    a pad having an inside face and an outside face for pressing against the wall of the borehole;
    a set of measurement electrodes mounted on the outside face of the pad and means for measuring the potential difference between two measurement electrodes;
    a source electrode adapted to inject current into the formation and a return electrode, the set of measurement electrodes being situated between the source electrode and the return electrode;
    shielding means which are arranged between the source electrode and the measurement electrodes and between the measurement electrodes and the return electrode, and
    wherein said shielding means being located substantially flush with the outside face of the pad and extending along the length of the outside face of the pad so that the electric field generated by the current and return electrodes is substantially eliminated in the pad and in the vicinity of the measurement electrodes.

2. Apparatus according to claim 1, wherein the pad itself constitutes the shielding means; said pad being made of electrically conductive material.

3. Apparatus according to claim 2, further comprising electrically insulating inserts arranged in the pad around each of the source, return and measurement electrodes.

4. Apparatus according to claim 3, wherein the outside face of the conductive pad is electrically insulated from the formation by insulating means.

5. Apparatus according to claim 4, wherein the insulating means comprise an insulating layer of non conductive material, said layer covering the outside face of the pad.

6. Apparatus according to claim 4, wherein the insulating means comprise spacer means that maintain a standoff between the outside face of the pad and the borehole wall.

7. Apparatus according to claim 1, wherein the pad is made of electrically non conductive material and the shielding means comprise electrically conductive sheets that are arranged inside said pad such that said conductive sheets are almost flush with the outside face of said pad.

8. Apparatus according to claim 7, wherein the electrically conductive sheets comprise first sheets that face each of the current, return and measurement electrodes and are molded on or adjacent to the inside face of the pad and second sheets that are molded almost flush with the outside face of the pad, said first and second sheets being connected to each others.

9. Apparatus according to claim 7, wherein the shielding means comprise a first sheet that covers the inside face of the pad and second sheets that are almost flush with the outside face of the pad.

10. Apparatus according to claim 9, wherein the recesses between the second sheets and the outside face of the pad are filled with a non-conductive material.

11. Apparatus according to claim 1, wherein the shielding means are held at a potential close to that of the formation.

12. Apparatus according to claim 1, wherein the pad electrically contacts the formation through a conductive wear plate that is situated on the outside face of said pad.

13. Apparatus according to claim 1, wherein the inside face of the pad is attached to a metallic base such that a cavity remains between said base and inside face of the pad, said cavity being adapted to receive electronic means for processing signals coming from the measurement electrodes.

14. Method for investigating the wall of a borehole in a geological formation wherein a borehole filled with non-conductive mud passes, the method comprising:
    pressing a pad against the borehole wall, said pad comprising a current electrode and a return electrode;
    injecting a current into the formation via said current electrode and said return electrode between which a potential is applied;
    measuring the potential difference between at least two measurement electrodes situated on the pad between the source electrode and the return electrode, said potential difference being representative of the formation resistivity;
    shielding the measurement electrodes with shielding means between the source electrode and the measurement electrodes and between the measurement electrodes and the return electrode; and
    wherein said shielding means are located substantially flush with the outside face of the pad and extending along the length of the outside face of the pad such that the electric field generated by the current and return electrodes is substantially eliminated in the pad and in the vicinity of the measurement electrodes.

* * * * *